(12) United States Patent
Bunker

(10) Patent No.: US 10,350,684 B2
(45) Date of Patent: Jul. 16, 2019

(54) ADDITIVE MANUFACTURING METHOD FOR MAKING COMPLEX FILM HOLES

(71) Applicant: General Electric Company, Schenectady, NY (US)

(72) Inventor: Ronald Scott Bunker, West Chester, OH (US)

(73) Assignee: General Electric Company, Schenectady, NY (US)

(*) Notice: Subject to any disclaimer, the term of this patent is extended or adjusted under 35 U.S.C. 154(b) by 398 days.

(21) Appl. No.: 14/937,325

(22) Filed: Nov. 10, 2015

(65) Prior Publication Data
US 2017/0129014 A1  May 11, 2017

(51) Int. Cl.
| | | |
|---|---|---|
| B22F 5/04 | (2006.01) |
| B22F 7/08 | (2006.01) |
| F01D 5/18 | (2006.01) |
| B22F 3/105 | (2006.01) |
| B33Y 80/00 | (2015.01) |
| B22F 5/00 | (2006.01) |
| B33Y 40/00 | (2015.01) |
| B22F 5/10 | (2006.01) |

(52) U.S. Cl.
CPC .............. B22F 5/04 (2013.01); B22F 3/1055 (2013.01); B22F 7/08 (2013.01); B33Y 80/00 (2014.12); F01D 5/186 (2013.01); *B22F 2005/103* (2013.01); *B33Y 40/00* (2014.12); *F05D 2230/10* (2013.01); *F05D 2230/31* (2013.01); *F05D 2260/202* (2013.01); *Y02P 10/295* (2015.11); *Y02T 50/676* (2013.01)

(58) Field of Classification Search
CPC .. B22F 5/04; B22F 7/08; B22F 3/1055; B22F 7/04; B22F 2007/045; F01D 5/186; Y02T 50/676; Y02P 10/295; F05D 2230/31; F05D 2230/10; F05D 2260/202; B33Y 80/00; B33Y 10/00

See application file for complete search history.

(56) References Cited

U.S. PATENT DOCUMENTS

| 5,142,778 A | 9/1992 | Smolinski et al. |
| 5,997,251 A | 12/1999 | Lee |

(Continued)

FOREIGN PATENT DOCUMENTS

| CN | 103056604 A | 4/2013 |
| EP | 2685170 | 1/2014 |

(Continued)

OTHER PUBLICATIONS

Office Action issued in connection with corresponding CA Application No. 2946547 dated Nov. 3, 2017.

(Continued)

*Primary Examiner* — Thorl Chea
(74) *Attorney, Agent, or Firm* — Dority & Manning, P.A.

(57) ABSTRACT

A method of forming a cooling hole structure on a turbine component. The turbine component has a component wall with inner and outer surfaces. A bore passes through the component wall and fluidly connects the inner surface and the outer surface. The method includes the steps of: A) forming a recess communicating with the bore and the outer surface; and B) using an additive manufacturing process to form an exit region in the recess.

20 Claims, 8 Drawing Sheets

(56) References Cited

U.S. PATENT DOCUMENTS

| | | |
|---|---|---|
| 8,632,311 B2 | 1/2014 | Klasing et al. |
| 2007/0044306 A1 | 3/2007 | Szela et al. |
| 2013/0195673 A1 | 8/2013 | Godfrey et al. |
| 2013/0280091 A1 | 10/2013 | Propheter-Hinckley et al. |
| 2014/0079540 A1 | 3/2014 | Morris et al. |
| 2014/0216042 A1 | 8/2014 | Hanson |
| 2015/0037498 A1 | 2/2015 | Bruck et al. |
| 2016/0032766 A1* | 2/2016 | Bunker .................. B23K 26/34 165/170 |
| 2016/0089719 A1 | 3/2016 | Lacy et al. |

FOREIGN PATENT DOCUMENTS

| | | |
|---|---|---|
| JP | S60-177107 A | 9/1985 |
| JP | 2012-127000 A | 7/2012 |
| JP | 2014-513207 A | 5/2014 |
| JP | 2014-177938 A | 9/2014 |
| WO | 2013163037 | 10/2013 |
| WO | 2014/107204 A2 | 7/2014 |
| WO | 2014121060 | 8/2014 |
| WO | 2014/150490 A1 | 9/2014 |
| WO | 2014150490 | 9/2014 |

OTHER PUBLICATIONS

Machine Translation and Notification of Reasons for Refusal issued in connection with corresponding JP Application No. 2016-212428 dated Nov. 14, 2017.

Bikas, H., et al., "Additive manufacturing methods and modelling approaches: a critical review," International Journal of Advanced Manufacturing Technology, vol. 83, pp. 389-405 (Jul. 24, 2015).

Extended European Search Report issued in connection with corresponding EP Application No. 16198009.9 dated May 30, 2017.

First Office Action and Search issued in connection with corresponding CN Application No. 201610989220.0 dated Dec. 20, 2017.

Office Action issued in connection with corresponding EP Application No. 16198009.9 dated Jun. 21, 2018.

Office Action issued in connection with corresponding CA Application No. 2946547 on Sep. 21, 2018.

* cited by examiner

ADDITIVE MANUFACTURING METHOD FOR MAKING COMPLEX FILM HOLES

BACKGROUND OF THE INVENTION

The present invention relates to hole formation in turbine components and more specifically to the formation of complexly shaped film holes and a method for making same by additive manufacturing.

Airfoils in a turbine engine often include cooling holes for discharging a film of cooling air along the outer surface of the airfoil to affect film cooling. These may be referred to as "film cooling holes" or "film holes."

In order to improve the performance of cooling holes it is also known to modify their shape to affect cooling flow diffusion. The diffusion reduces the discharge velocity and increases the static pressure of the airflow. Diffusion cooling holes are known in various configurations for improving film cooling effectiveness by providing a greater coverage of coolant film on the hot surfaces of components. A typical diffusion film cooling hole may be generally conical from inlet to outlet with a suitable increasing area ratio for affecting diffusion without undesirable flow separation. Typical diffusion film cooling holes also incorporate a metering section at or near the inlet to control the flow rate to a desirable magnitude. Diffusion occurs along at least a portion of the length of the hole, typically towards the exit, and may be in the lateral and/or longitudinal directions, or combinations thereof. Other types of diffusion cooling holes are also found in the prior art including various generally rectangular-shaped hole exits to provide varying performance characteristics.

Conventional methods for forming film holes include casting and machining. One problem with film holes produced by conventional methods is they are limited in shape by the manufacturing process.

Therefore there is a need for a manufacturing process for producing complexly shaped film holes in turbine blade components. Such complex film holes allow for precise delivery of cooling fluid such that the cost of such cooling fluid in lost engine efficiency is minimized and/or reduced.

BRIEF DESCRIPTION OF THE INVENTION

This need is addressed by a method of forming a portion of a film hole using an additive manufacturing process.

According to one aspect of the present invention there is provided a method of forming a cooling hole structure on a turbine component. The turbine component has a component wall with inner and outer surfaces. A bore passes through the component wall and fluidly connects the inner surface and the outer surface. The method includes forming a recess communicating with the bore and the outer surface; and using an additive manufacturing process to form an exit region in the recess.

According to one aspect of the present invention there is provided a method of forming a cooling hole structure on a turbine component having a component wall with inner and outer surfaces, wherein a bore passes through the component wall and fluidly connects the inner surface and the outer surface. The method includes forming a recess communicating with the bore and the outer surface; and using an additive manufacturing process to form a section of a film hole that changes dimension with distance along the hole centerline.

BRIEF DESCRIPTION OF THE DRAWINGS

The invention may be best understood by reference to following description taken in conjunction with the accompanying drawing figures in which.

DETAILED DESCRIPTION OF THE INVENTION

Figure 1:
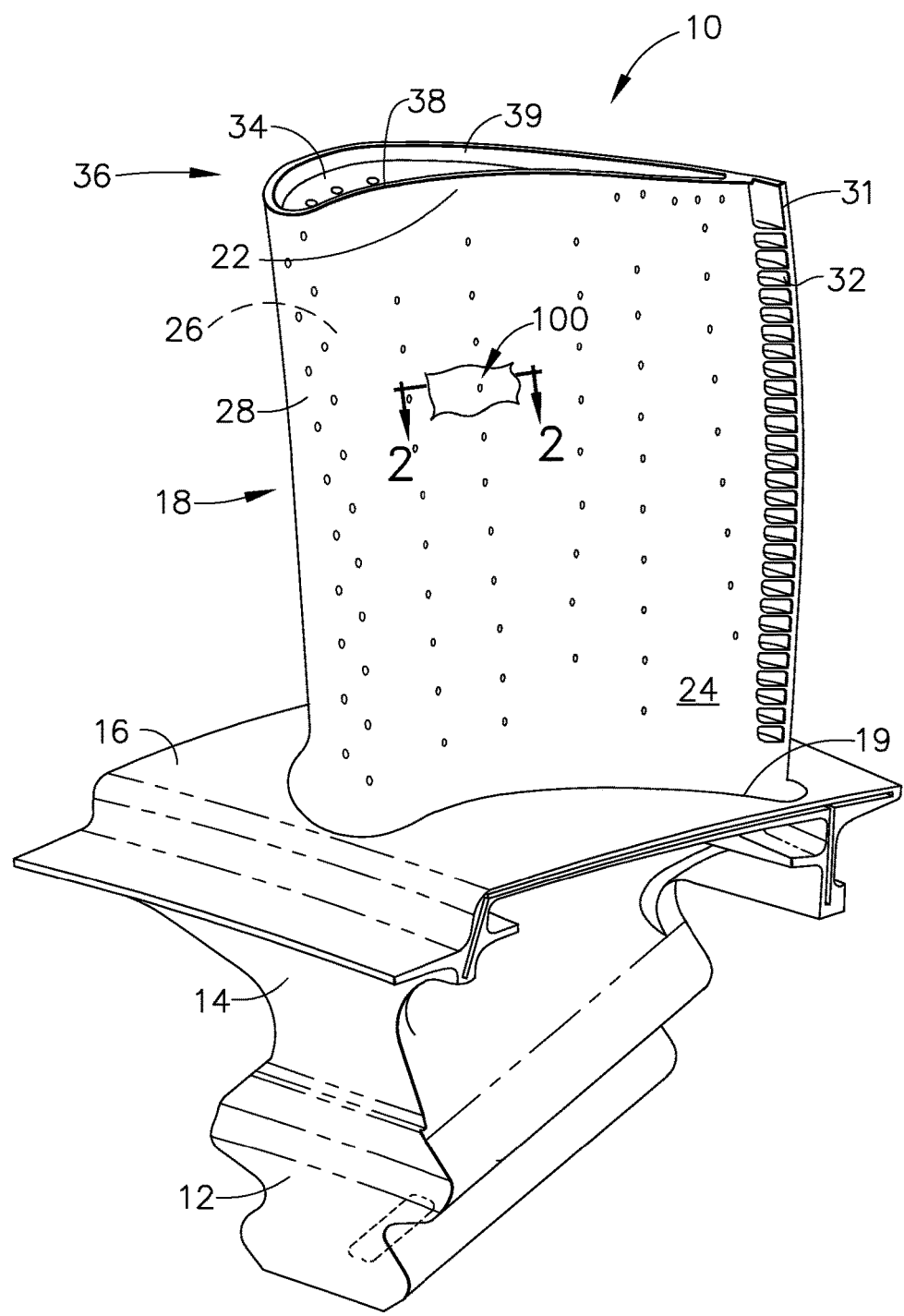
FIG. 1 is a perspective view of a turbine blade for inclusion in an aircraft engine wherein a wall of the turbine blade includes multiple film holes for cooling the wall.

Referring to the drawings wherein identical reference numerals denote the same elements throughout the various views, FIG. 1 illustrates an exemplary turbine blade 10. The turbine blade 10 includes a conventional dovetail 12, which may have any suitable form including tangs that engage complementary tangs of a dovetail slot in a rotor disk (not shown) for radially retaining the blade 10 to the disk as it rotates during operation. A blade shank 14 extends radially upwardly from the dovetail 12 and terminates in a platform 16 that projects laterally outwardly from and surrounds the shank 14. A hollow airfoil 18 extends radially outwardly from the platform 16 and into the hot gas stream. The airfoil has a root 19 at the junction of the platform 16 and the airfoil 18, and a tip 22 at its radially outer end. The airfoil 18 has a concave pressure side wall 24 and a convex suction side wall 26 joined together at a leading edge 28 and at a trailing edge 31.

The airfoil 18 may take any configuration suitable for extracting energy from the hot gas stream and causing rotation of the rotor disk. The airfoil 18 may incorporate a plurality of trailing edge bleed slots 32 on the pressure side wall 24 of the airfoil 18, or it may incorporate a plurality of trailing edge cooling holes (not shown). The tip 22 of the airfoil 18 is closed off by a tip cap 34 which may be integral to the airfoil 18 or separately formed and attached to the airfoil 18. An upstanding squealer tip 36 extends radially outwardly from the tip cap 34 and is disposed in close proximity to a stationary shroud (not shown) in the assembled engine, in order to minimize airflow losses past the tip 22. The squealer tip 36 comprises a suction side tip wall 38 disposed in a spaced-apart relationship to a pressure side tip wall 39. The tip walls 39 and 38 are integral to the airfoil 18 and form extensions of the pressure and suction side walls 24 and 26, respectively. The outer surfaces of the pressure and suction side tip walls 38 and 39 respectively form continuous surfaces with the outer surfaces of the pressure and suction side walls 24 and 26. A plurality of film cooling holes 100 pass through the exterior walls of the airfoil 18. The film cooling holes 100 communicate with an interior space of the airfoil 18 (not shown), which may include a complex arrangement of cooling passageways defined by internal walls, such as a serpentine configuration. Please note that airfoil 18 may be made from a material such as a nickel- or cobalt-based alloy having good high-temperature creep resistance, known conventionally as "superalloys."

Figure 2:
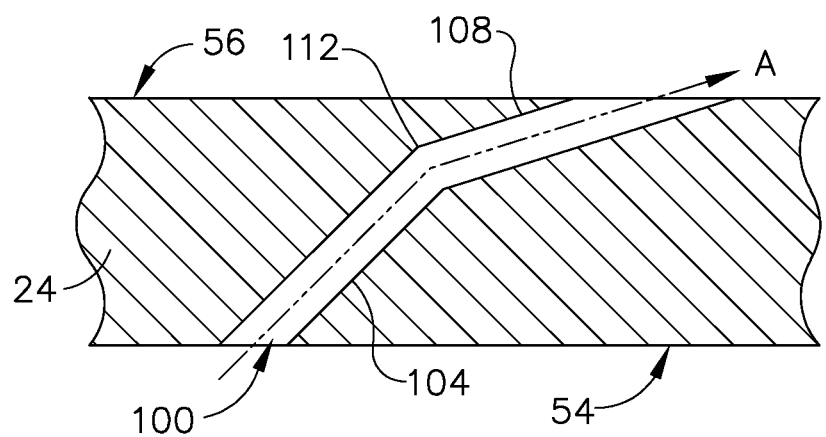
FIG. 2 is a cross-sectional view of a portion of the turbine blades shown in FIG. 1 taken at line 2-2 showing a complex film hole formed in accordance with a method for manufacturing the film hole by additive manufacturing.

FIG. 2 illustrates one of the film cooling holes 100 in more detail. The film hole 100 extends from an interior surface 54 of the pressure side wall 24 to an outer surface 56 of the pressure side wall 24. The film hole 100 includes an entry section 104 and an exit section 108. The entry section 104 is often referred to as a "metering section," is generally round, and has a centerline. The entry section 104 and the exit section 108 meet at a transition area 112. In this regard, the entry section 104 extends from interior surface 54 to the transition area 112.

Figure 3:
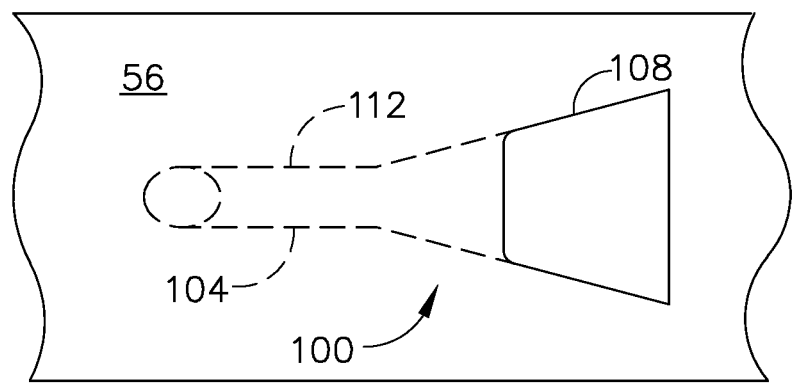
FIG. 3 is a plan view of a portion of the turbine blades shown in FIG. 1 showing a complex film hole.

The exit section 108 has an increasing flow area from the transition area 112 to the outer surface 56. As seen in FIG. 3, the dimensions of the exit section 108 increase in the lateral direction relative to the centerline of the exit section along the direction of flow. This type of structure is often referred to as a "diffuser section" or "fan section" and may take on various shapes such as conical, quadrilateral, or multifaceted.

The example of FIG. 3 is a non-limiting geometry. It should be understood that the diffusion of the film hole may take place in one direction relative to the hole centerline, e.g. lateral as depicted, or in multiple directions, e.g. conical, or in other various shapings. It should also be understood that such shaping may take place in the exit region, or in the transition region, or both. Stated another way, in a film hole formed according to the method described below, cross-sections taken at different points along the centerline and had different areas in differently shaped parameters. The film hole 100 is configured such that it defines a nonlinear fluid flow path A. Fluid path A changes direction and expands as it passes through transition area 112. The film cooling hole 100 is an example of a complex film hole and more specifically, complex film hole 100 is an example of a non-line-of-sight hole. As used herein, the term "complex" refers to any hole including any portion or feature other than a bore having a single straight circular cross-section. By way of example and not limitation, such holes include those that cannot be manufactured by common methods such as laser drilling and electro-discharge machining.

Figure 4:
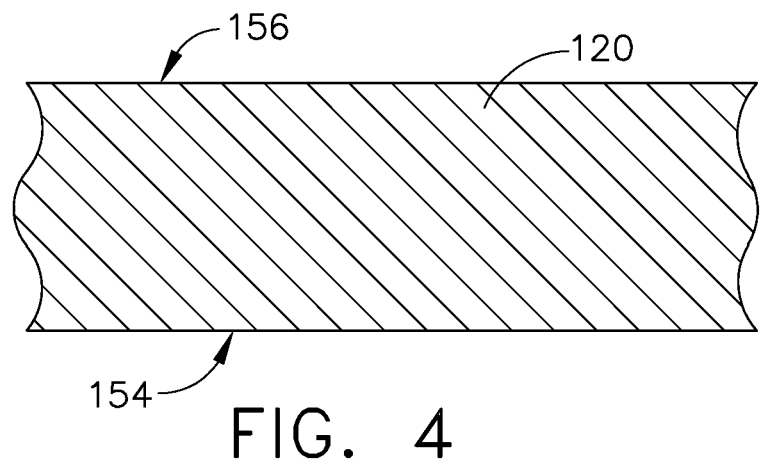
FIG. 4 is a cross-sectional view of a portion of a wall section blank generated during one step of the manufacturing process of the turbine blade of FIG. 1 taken along line 2-2 in FIG. 1.
Figure 5:
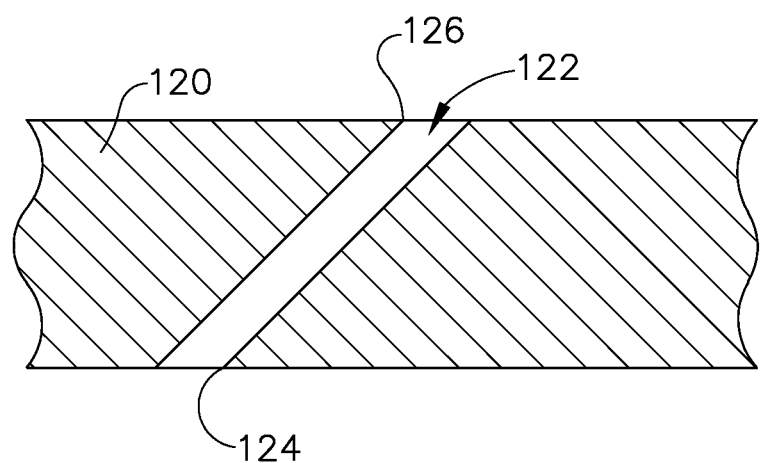
FIG. 5 is a cross-sectional view of the wall section of FIG. 3, showing a hole formed therethrough.

A method of manufacturing a complex film hole such as film hole 100 will now be described. First, a wall section 120 as shown in FIG. 4 is provided. The wall section 120 is generally representative of the wall section of any turbine component, of any shape such as flat, convex, concave, and/or complexly curved. One such wall section 120 is suction side wall 26 described above, and includes opposed inner and outer surfaces 154 and 156 respectively. It should be understood that the providing step of the wall section 120 includes but is not limited to manufacturing of the wall section 120 or obtaining a pre-manufactured wall section 120. Methods of manufacturing the wall section 120 include but are not limited to those conventionally known such as casting, machining, and a combination thereof. Secondly according to the illustrated embodiment, a bore 122 as shown in FIG. 5 is formed through the wall section 120. It should be appreciated that the bore 122 is formed according to conventional means such as machining, drilling. Additionally, the bore 122 can be formed during the formation of the wall section 120 by a method such as casting.

Figure 6:
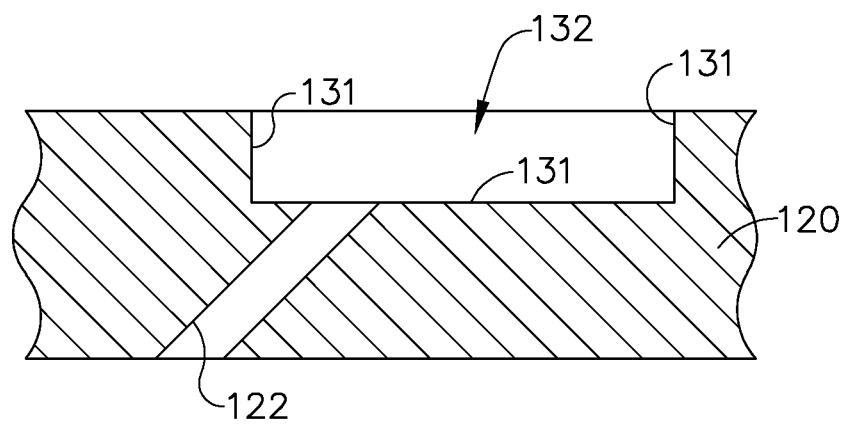
FIG. 6 is a cross-sectional view of a portion of the turbine component of FIG. 5, showing that material has been removed from the turbine component near one end of the hole of the wall section such that a recess is defined.

Bore 122 extends from a first end 124 to a second end 126. Referring to FIG. 6, the next step is removing a portion of the wall section 120 that defines the second end 126 of the bore 122. Which is optionally followed by removing a further portion of the wall section 120 such that the second end 126 of the bore 122 is redefined around at least a portion of its circumference. In this manner, recess 132 is formed at second end 126 of the tube and prepared to receive additional material. Recess 132 is in fluid communication with surface 156 and bore 122. Recess 132 is defined by a surface 131. By way of example and not limitation, can be formed by one of the following processes; milling, casting, drilling, machining, and a combination thereof.

Following the steps of preparing bore 122 for receiving additional material near the second end 126, steps related to reconfiguring second end 126 of bore 122 using an additive manufacturing process are implemented.

Figure 7:
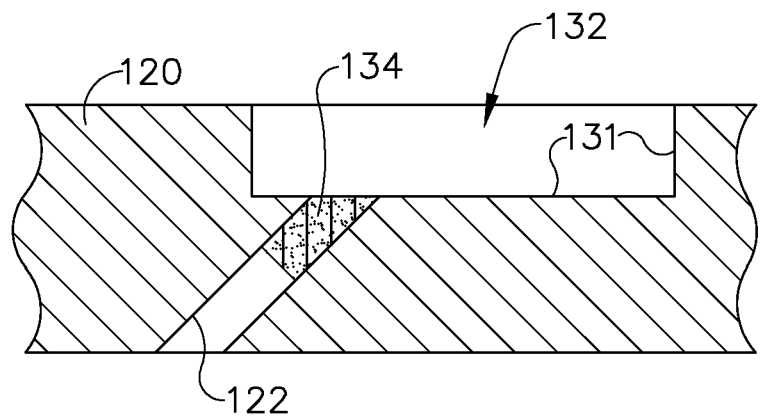
FIG. 7 is a cross-sectional view of a portion of the wall section shown in FIG. 6 wherein a section of the hole near the recess has been blocked.

The additive manufacturing process can optionally begin with a step of blocking bore 122 with a plug 134 as shown in FIG. 7. It should be appreciated that blocking of bore 122 is not necessary and that the additive manufacturing process can begin with a step of positioning wall section 120 or it can begin with the steps of applying an adhesive and/or applying powder. In the illustrated embodiment, plug 134 is positioned where bore 122 engages recess 132 and is configured such that the powder from subsequent additive manufacturing steps is prevented from entering bore 122. It should be appreciated that by way of example and not limitation, bore 122 can be blocked utilizing at least one of the following materials: a polymer, unfused powder, a wax or other material, and a combination thereof. It should be appreciated that these materials are chosen such that they can be removed from the finished part by solvation, mechanical means, heat, or a combination thereof.

Figure 8:
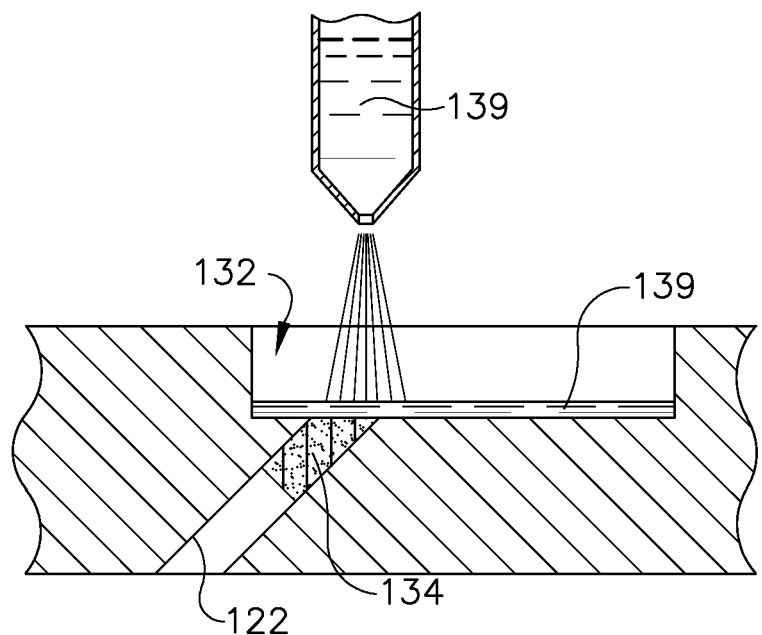
FIG. 8 is a cross-sectional view of a portion of the wall section shown in FIG. 7 wherein adhesive is being applied to the wall section.

Referring now to FIG. 8, an optional step of adding applying an adhesive substance 139 to the recess 132 in predetermined locations can be performed.

Figure 9:
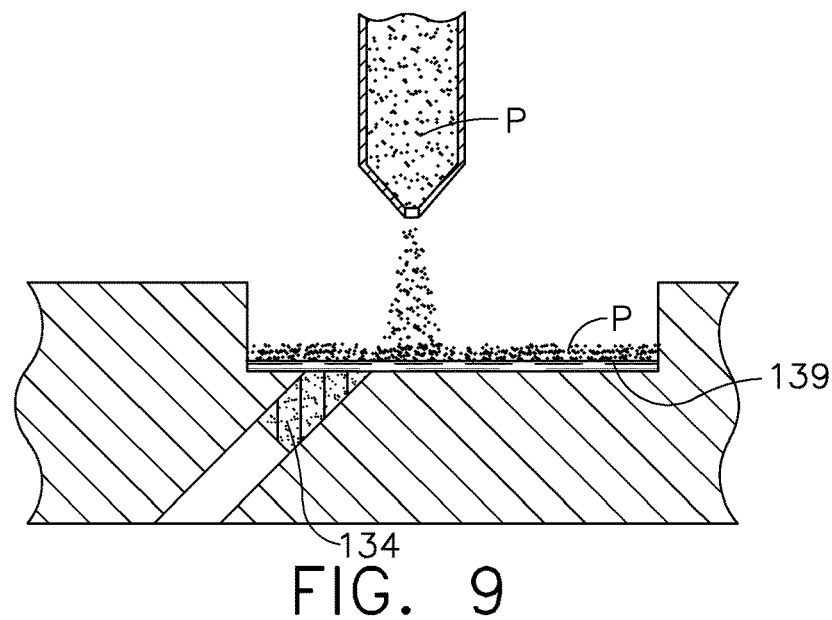
FIG. 9 is a cross-sectional view of a portion of the wall section of FIG. 8, showing powder being applied to the wall section.

As shown in FIG. 9, a powder P for example, metallic, ceramic, and/or organic powder is deposited onto the adhesive layer 139. As a non-limiting example, the thickness of the powder layer may be about 10 micrometers (0.0004 in.).

The powder P may be applied by dropping or spraying the powder over the recess 132, or by dipping the wall section 120 in powder. Powder application may optionally be followed by brushing, scraping, blowing, or shaking as required to remove excess powder, for example to obtain a uniform layer. It is noted that the powder application process does not require a conventional powder bed or planar work surface, and the part may be supported by any desired means, such as a simple worktable, clamp, or fixture.

Figure 10:
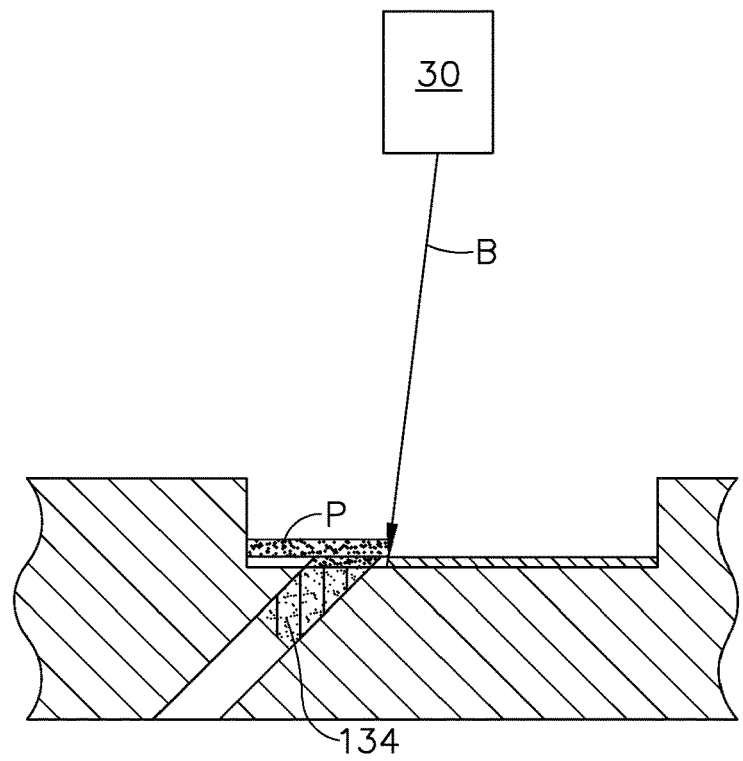
FIG. 10 is a cross-sectional view of a portion of the wall section of FIG. 9, showing powder being fused.

Once the powder P is adhered, a directed energy source B (such as a laser or electron beam) is used to melt a layer of the structure being built as shown in FIG. 10. The directed energy source emits a beam and a beam steering apparatus is used to steer the beam over the exposed powder surface in an appropriate pattern. The exposed layer of the powder is heated by the beam to a temperature allowing it to melt, flow, and consolidate and fuse to or adhere to substrate with which it is in contact. In this manner, the metallic particles that made up powder P now exist as part of the wall section 120. This step may be referred to as fusing the powder. Unfused powder can be removed at this stage prior to the next cycle of applying an adhesive, applying powder, and fusing the powder. However, in the illustrated embodiment, unfused powder that is not removed in each step remains in place. In this regard the unfused powder can operate to support powder of the next layer.

Figure 11:
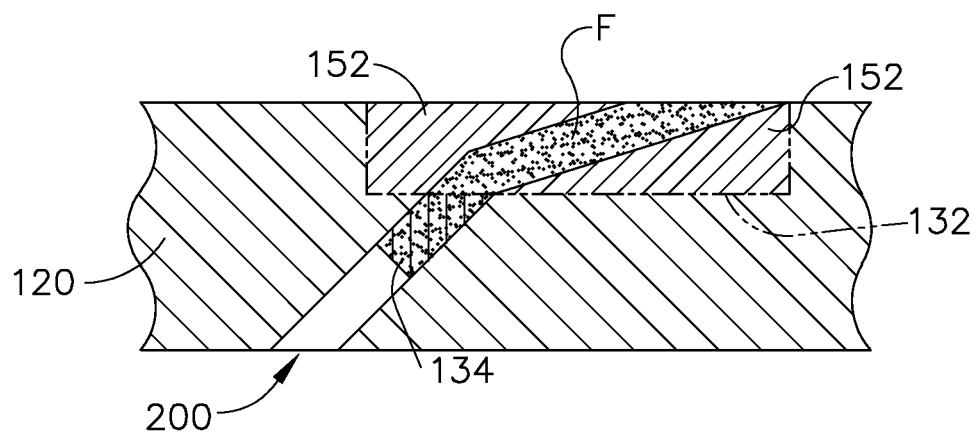
FIG. 11 is a cross-sectional view of a portion of the wall section of FIG. 10, showing new material that has been added to the recess to define a transition area for a diffuser section beginning at the end of the blocked hole.
Figure 12:
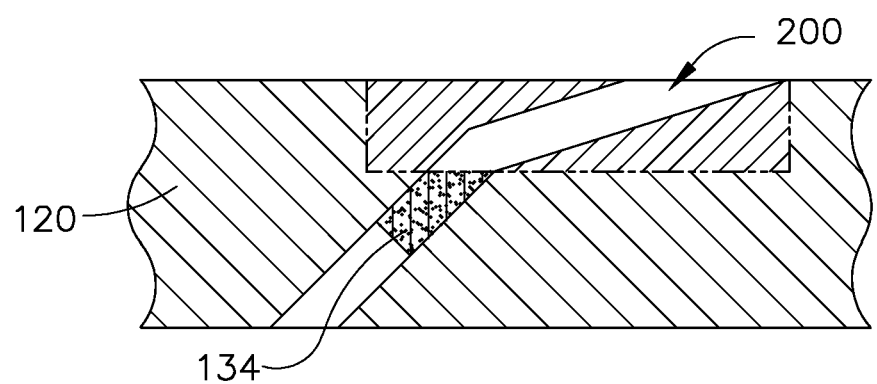
FIG. 12 is a cross-sectional view of the wall section FIG. 11 wherein the unfused powder has been removed.
Figure 13:
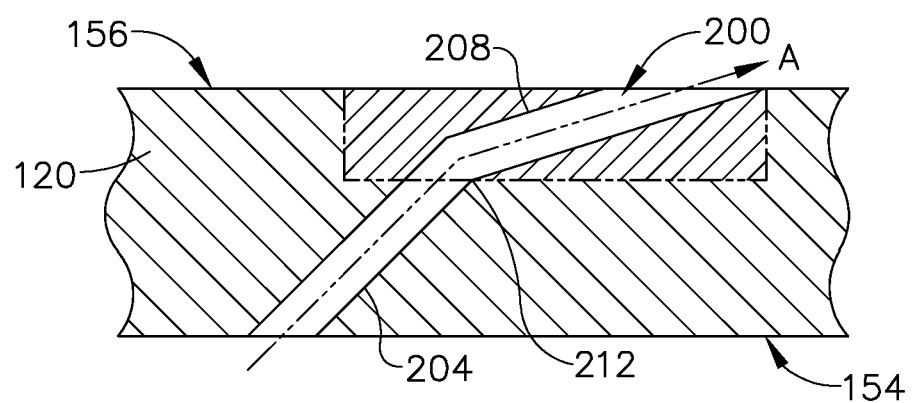
FIG. 13 is a cross-sectional view of the wall section shown in FIG. 12 wherein the blocking material has been removed and the profile of a complex film hole manufactured in accordance with the method described below is shown.

This cycle of adhering powder, removing excess powder, and then directed energy melting the powder is repeated until the entire component is complete. When the component is complete, as shown in FIG. 11, new material 152 is positioned in recess 132 and defines film hole 200. Film hole 200 includes an entry section 204, and exit section 208, the transition section 212. Film hole 200 is at least partially filled with filler F. By way of example and not limitation, filler F includes one of the following: unfused powder P, adhesive 139, blocking material 134, and a combination thereof. In a finishing step filler F and any other unfused and unbonded powder or adhesive from previous steps can be removed in one cleaning step. Alternatively, two cleaning steps could be used. One to remove loose filler F material from film hole 200 by air pressure or air jet resulting in structure shown in FIG. 12. And a second for removing plug 134 by a method such as dissolving with solvents, using heat to disperse, or the like which results in the structure shown in FIG. 13. It should be noted that the structure shown in FIG. 13 is substantially the same as that shown in FIG. 2 except new material added via the present method is highlighted.

Alternatively, finishing and cleaning steps can be performed such that the inner surface 154, the outer surface 156, and the film hole 200 have the desired finishes and debris such as powder and adhesive particles are removed. The process described is merely one example of an additive manufacturing process. "Additive manufacturing" is a term used herein to describe a process which involves layer-by-layer construction or additive fabrication (as opposed to material removal as with conventional machining processes). Such processes may also be referred to as "rapid manufacturing processes". Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Sterolithography (SLA), Electron Beam Melting (EBM), Laser Engineered Net Shaping (LENS), and Direct Metal Deposition (DMD).

The process described herein has several advantages over the prior art. The additive manufacturing process is far more flexible as to shape and configuration of film holes that can be manufactured. In addition, it is believed that the additive manufacturing process allows lower heat generation during formation of film holes and thus less deformation of crystalline structure and turbine blade shape.

The method described above provides a means for creating film holes or other similar orifices of complex exit shaping, without the need for conventional machining processes such as drilling, EDM forming, or laser trepanning. It avoids the complexities of such conventional methods by permitting a complex exit shape to be formed in a single process. This will permit both flexibility and cost reductions in making complex cooled components. This in turn has the potential of increasing cooling efficiency of turbine components and lowering engine specific fuel consumption ("SFC").

The foregoing has described an apparatus and method for additive manufacturing of film holes in turbine blades. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A method of forming a cooling hole structure on a turbine component, the method comprising:
   forming a recess in a component wall, the wall having an inner surface and an outer surface, and a bore passing through the component wall and fluidly connecting the inner surface and the outer surface, the recess fluidly communicating with the bore and the outer surface; and
   using an additive manufacturing process to form an exit region in the recess, the additive manufacturing process comprising sequentially depositing a plurality of layers of metal powder and fusing the metal powder using a directed energy source, the exit region comprising fused metal powder that at least partially refills the recess with a cooling hole therethrough fluidly communicating with the bore and the outer surface, the cooling hole defined by an inner surface of the fused metal powder.

2. The method of claim 1 further comprising depositing metal powder on a first surface that defines at least a portion of the recess; and
   fusing the metal powder in a pattern corresponding to a layer of the cooling hole structure.

3. The method of claim 2 further comprising repeating in a cycle the steps of depositing and fusing to build up the cooling hole structure in a layer-by-layer fashion.

4. The method of claim 3 wherein the repeating cycle of depositing and fusing results in the component including both fused and un-fused metal powder, the method further comprising removing the un-fused metal powder.

5. The method of claim 2 wherein the metal powder is adhered to the first surface by:

applying an adhesive to the first surface; and
applying powder to the adhesive.

6. The method of claim 5 further comprising removing excess metal powder after the metal powder is applied to the adhesive.

7. The method of claim 2 further comprising forming a plug in the bore and depositing metal powder on the plug.

8. The method of claim 7 further comprising fusing the metal powder such that the pattern leaves unfused metal powder over at least a portion of the plug.

9. The method of claim 8 further comprising forming a diffusing section by fusing subsequent layers such that unfused metal powder of each subsequent layer overlaps unfused metal powder of a previous layer.

10. The method of claim 1 wherein the component comprises a metal alloy.

11. The method of claim 1 wherein the metal powder comprises a metal alloy.

12. A method of forming a film-cooling hole structure on a turbine component, the method comprising:
    forming a recess in a component wall, the wall having an inner surface and an outer surface, and a bore passing through the component wall and fluidly connecting the inner surface and the outer surface, the recess fluidly communicating with the bore and the outer surface; and
    using an additive manufacturing process to form a section of a film-cooling hole within the recess, the additive manufacturing process comprising sequentially depositing a plurality of layers of metal powder and fusing the metal powder using a directed energy source, the section of the film-cooling hole defined by fused metal powder that at least partially refills the recess with the film-cooling hole passing therethrough, the section of the film-cooling hole changing dimension with distance along a longitudinal centerline of the film-cooling hole.

13. The method of claim 12 further comprising depositing metal powder on a first surface that defines at least a portion of the recess; and
    fusing the metal powder in a pattern corresponding to a layer of the film-cooling hole structure.

14. The method of claim 13 further comprising repeating in a cycle the steps of depositing and fusing to build up the film-cooling hole structure in a layer-by-layer fashion.

15. The method of claim 14 wherein the cycle of depositing and fusing results in the component including both fused and un-fused metal powder, the method further comprising removing the un-fused metal powder.

16. The method of claim 13 wherein the metal powder is adhered to the first surface by:
    applying an adhesive to the first surface; and
    applying metal powder to the adhesive.

17. The method of claim 16 further comprising removing excess metal powder after the metal powder is applied to the adhesive.

18. The method of claim 13 further comprising forming a plug in the bore and depositing metal powder in a layer that at least partially overlaps the plug.

19. The method of claim 18 further comprising fusing the metal powder in the layer such that the pattern leaves unfused metal powder over at least a portion of the plug.

20. The method of claim 19 further comprising forming an exit section of the film hole by fusing subsequent layers such that unfused metal powder of each subsequent layer overlaps both unfused and fused metal powder of a previous layer.

* * * * *